March 11, 1941.   J. W. LYNCH   2,234,929
SHAVING IMPLEMENT
Filed Nov. 22, 1939
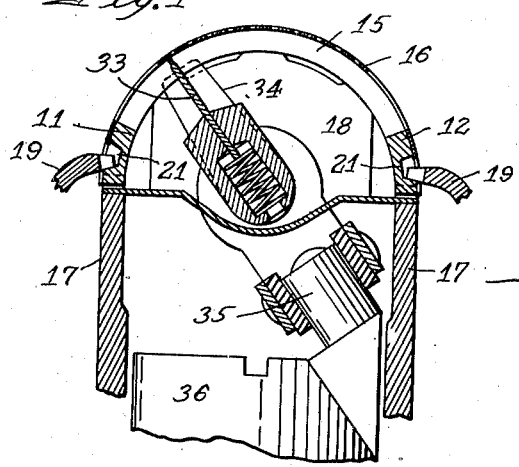
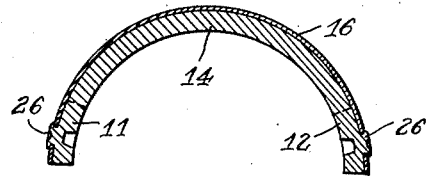
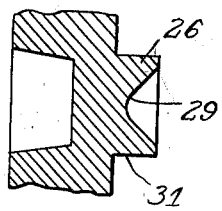
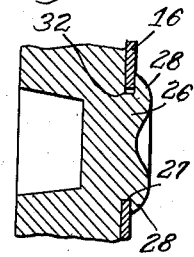
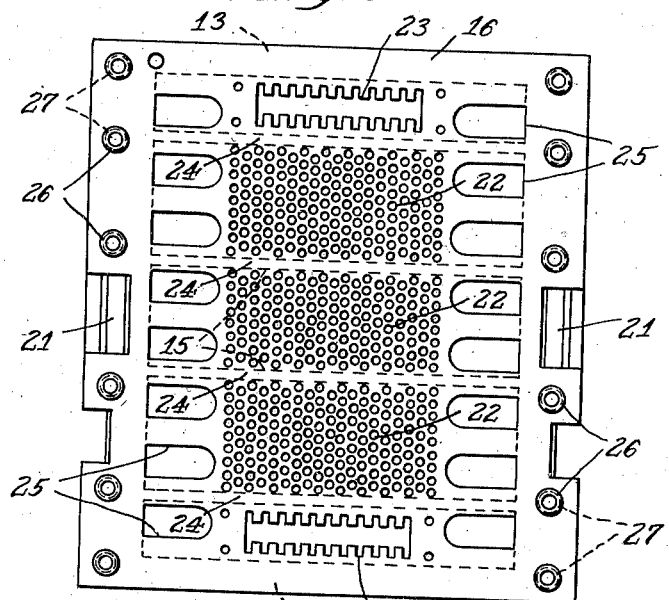
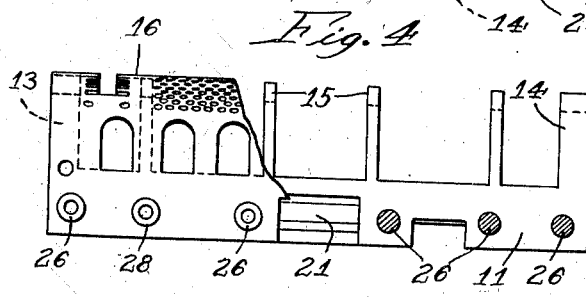

Patented Mar. 11, 1941

2,234,929

UNITED STATES PATENT OFFICE 2,234,929

SHAVING IMPLEMENT

John W. Lynch, Chicago, Ill., assignor to Chicago Flexible Shaft Company, Chicago, Ill., a corporation of Illinois Application November 22, 1939, Serial No. 305,714

5 Claims. (Cl. 30—43)

This invention relates to shaving implements of the type known as "dry shavers" and has more particular reference to the construction of the skin-engaging shearing member commonly known as the "comb." My invention refers to that type of comb unit which comprises a shearing member of thin sheet metal reinforced by a supporting frame. The thin shearing member is perforated to provide hair-receiving openings, the inner edges of which constitute cutting or shearing edges in cooperation with a movable cutter. The shearing member is of such thinness that it does not have sufficient rigidity to be self-sustaining in operation and prior to my present invention a skeleton supporting frame has been provided to which the thin shearing member is conformed and united. This frame supports the thin shearing member in the desired shearing relation to the movable cutter. Also, in the preferred embodiment, the thin shearing member and the supporting frame constitute a replaceable unit well adapted for quick removal and replacement. This unit, because of its construction, promotes greater accuracy and precision in the location of its shearing edges in relation to the movable cutter and thereby improves the cutting qualities in an implement of this kind.

A difficult problem is presented in supporting the shearing member so that the thin resilient portion having the cutting edges will be held with accuracy and precision in relation to the movable cutter. This difficulty is remedied in the present invention, one of the objects of which is to provide improved means for positively clamping and interlocking the thin resilient member to the skeleton frame without the intervention of any connecting medium such as is employed with soldering or brazing. By this means the thin shearing member will maintain its position indefinitely and the danger of such member becoming loosened or detached from its frame is avoided. This also avoids certain difficulties incidental to soldering and brazing methods.

Another object of my invention is to provide a structure of the character described in which the thin shearing member is positively clamped and interlocked to the supporting frame by means of swaging or riveting the metal of the one of said members over the other.

Another object of my invention is to provide a structure of the character described in which the swaging or riveting serves to draw or stretch the thin shearing member tightly against the surfaces of the supporting frame on which it is seated, to thereby accurately conform the thin member to the shape of said supporting surfaces and permanently retain it in such shape.

Another object of my invention is to improve the construction of the comb unit by applying the uniting means, such as swaging, riveting, welding, or the like, at localized points in alignment with the supporting ribs of the frame whereby to avoid distortion stresses on the thin shearing member.

Another object of my invention is to provide improved means for uniting the thin shearing member and the supporting frame with the view to promoting greater economy in the cost of manufacture of these parts.

Another object of my invention is to improve the construction of the thin shearing member and the supporting frame as a replaceable unit by the provision of mechanical means for positively clamping and interlocking the thin shearing member to the frame.

While my improvements may be constructed in any of various ways, I have here shown, for purpose of illustration, a single embodiment.

Referring to the drawing:

Fig. 1 is a fragmentary sectional view on an enlarged scale of a shaving implement embodying my invention;

Fig. 2 is a flat development view of the thin shearing member and the supporting frame riveted together;

Fig. 3 is a cross-section through the comb unit which comprises the supporting frame and the thin shearing member riveted thereto in accordance with my invention;

Fig. 4 is a side elevation of the comb unit with a portion of the thin shearing member broken away to show the supporting frame in elevation;

Fig. 5 is an enlarged fragmentary vertical section through one of the extruded rivets; and Fig. 6 is a similar view showing the thin shearing member applied and the rivet swaged over.

My improvements are preferably, but not necessarily, applied in a replaceable shearing unit at one end of a handle housing which serves to house the mechanism for operating the movable cutter. This mechanism usually includes a small electric motor, but other driving means may be used. In the drawing the handle housing and the motor have been omitted and I have shown only the replaceable shearing unit embodying the subject matter of my invention, together with means for supporting and holding said unit in operative position and a movable cutter cooperating with the thin shearing member of the unit.

In the preferred embodiment the supporting frame part consists of longitudinal members 11 and 12 in spaced parallel relation joined at their ends by curved ribs 13 and 14 and intermediate their ends by one or more similarly curved ribs 15. This constitutes a skeleton frame having the desired shape characteristics to which the thin shearing member or plate, designated generally by 16, is united. The surfaces of the frame on which the thin shearing member is supported, as well as the surfaces which locate and support the unit on the casing or main structure of the shaver, are formed or finished to a high degree of precision in order to accurately position the shearing edges in cooperation with the movable cutter. The unit may be suitably supported, as for example on a casing structure having side walls 17 and end walls 18 (only one of which is here shown). In this instance the unit is removably held in the operative position shown by means of fingers 19 which engage in sockets 21 in the longitudinal frame members 11 and 12 and clamp the unit down in working position on the casing structure. Upon withdrawing the fingers 19 the unit may be removed for cleaning, replacement and similar purposes.

The shearing member 16 is of thin sheet metal, preferably sheet steel which has been tempered so as to provide the desired edge-holding properties when perforated to provide cutting edges. In actual practice I have used sheets of different thicknesses, ranging from about .002" to .004". My present invention is not, however, confined to these dimensions. The sheet or plate 16 is the skin-engaging part of the shearing implement and it is perforated to provide hair-receiving openings, the inner edges of which constitute shearing or cutting edges. These perforations may be of any suitable or preferred form. As shown, the perforations are arranged in the areas intermediate the curved ribs of the supporting frame. In the example here shown the areas 22 are provided with small annular openings adapted for close shaving and the areas 23 have a different type of opening, including a tooth formation particularly adapted for long hair cutting. These perforate areas are separated by imperforate areas 24 which overlie and rest upon the ribs 15 of the supporting frame. The larger perforations 25 in rows along the longitudinal edges and adapted for relief or discharge of the cut hair are arranged so as not to interrupt the continuity of the imperforate portions 26 which extend to the marginal portions of the thin plate.

In the present embodiment of my invention I have provided means for positively clamping and interlocking the thin shearing plate to the supporting frame at localized points on the longitudinal members. This construction may be in the form of swaging, riveting, welding, or the like, between the two metal parts. In this embodiment I have provided annular rivets 26 extruded outwardly from the metal forming longitudinal members 11 and 12, as shown in Fig. 5. The rivets are located adjacent to the ends of the arched ribs 13, 14 and 15, substantially in alignment therewith. The thin plate is perforated along its longitudinal marginal portions to provide annular openings 27 for reception of the rivets. The heads of the rivets are peripherally swaged over at 28, as shown in Fig. 6, so as to positively clamp and interlock the thin plate to the frame. In the preferred construction each rivet is formed in the extruding step to provide a depressed center 29 and an annular periphery 31. Furthermore, opening 27 is slightly larger in diameter than its complemental rivet so that when the plate is assembled on the frame with the rivets projecting through the holes there will be a slight but appreciable clearance between the periphery of the rivets and the inside walls of the holes. The parts are of such dimensions and so proportioned that when the rivet heads are swaged over the plate each rivet at its lower side will engage the lower wall of the plate opening 27 and exert downward pressure against the plate to draw or stretch it tightly against the outer surfaces of the ribs but without setting up distortion stresses in the plate. As a consequence of this construction there is slight clearance between the periphery of the rivet and the hole in the plate at the upper side of the rivet, as shown at 32 in Fig. 6. By reason of this construction the thin plate is positively clamped and interlocked to the longitudinal members of the frame and the perforated shaving area of the plate is conformed to the accurately finished surfaces of the arched ribs and permanently retained thereon. Furthermore, it will be observed that the arched ribs are positioned in comparatively close relation so as to give substantial support to the perforated areas and thereby retain them in a determined shape conforming with the cutting edge of the movable cutter, or the path of travel thereof, as the case may be, depending on the type of shaving implement with which my invention is used.

In the type here shown, a movable cutter co-operates with the inner side of the thin shearing plate and is rapidly moved across the same in a cutting action. In the present example a flat cutter 33 is supported by a holder 34 which in turn is mounted in bearings in the end walls 18 to oscillate about the center thereof. Such oscillations are imparted by an eccentric pin 35 carried by a driving member 36 which in turn may be driven by an electric motor in the handle of the housing above mentioned, or by any suitable motive power.

While I have shown a particular embodiment of my invention, it will be understood that I do not wish to be limited thereto since many modifications may be made, and I therefore contemplate by the appended claims to cover any such modifications as fall within the true spirit and scope of my invention.

I claim:

1. A shaving implement comprising a supporting frame of metal having longitudinal members connected by a series of spaced ribs, a thin resilient shearing plate conforming to the shape of said ribs and having edges extending over the longitudinal members of the frame, a series of rivets extruded from a side of each longitudinal member and swaged over said edges of the plate, the rivet bodies being swaged off center in a direction to exert a pull on the plate to draw it against the ribs and positively clamp it to the frame, and a cooperating movable shearing member.

2. A shaving implement comprising a supporting frame of metal having longitudinal members connected by curved ribs, each longitudinal member having a series of rivets extruded from its outer side, a thin resilient shearing plate conforming to the curvature of said ribs and extending at its edges into proximity to the longitudinal members of the frame, the plate having perforations adjacent to its said edges positioned to receive said rivets, the rivets being swaged over the plate positively clamping it to said longitudinal members, and a cooperating movable shearing member.

3. A shaving implement comprising a supporting frame of metal having longitudinal members connected by curved ribs located at the ends of the frame and at one or more intermediate points, a thin resilient shearing plate conforming to the curvature of said ribs and extending at its edges into proximity to the longitudinal members of the frame, the longitudinal members having metal portions swaged over adjacent edges of the plate only at localized points substantially in alignment with said ribs positively clamping the plate to said longitudinal members without imposing distortion stresses on the portions of the shearing plate not directly supported on the curved ribs, and a cooperating movable shearing member.

4. A shaving implement comprising a supporting frame of metal having longitudinal members connected by a series of spaced ribs, a thin resilient shearing plate conforming to the shape of said ribs and having edges extending over the longitudinal members of the frame, said plate having imperforate portions overlying the ribs and a perforated portion intermediate adjoining imperforate portions, a series of rivets extruded from a side of each longitudinal member, each rivet positioned substantially in alignment with an imperforate portion and swaged over said edges of the plate for positively clamping and interlocking the plate to the frame without imposing distortion stresses on the perforate portions, and a cooperating movable shearing member.

5. A replaceable comb unit for a shaving implement comprising a supporting frame of metal having longitudinal members connected by curved ribs, each longitudinal member having a series of rivets extruded from its outer side, and a thin resilient shearing plate conforming to the curvature of said ribs and extending over the longitudinal members, the plate having perforations positioned to receive said rivets, the rivets being swaged over the plate positively clamping it to said longitudinal members.

JOHN W. LYNCH.